United States Patent [19]
Goetschmann et al.

[11] Patent Number: 5,379,155
[45] Date of Patent: Jan. 3, 1995

[54] AXIAL-SYMMETRIC JOINT OF HIGH THERMAL LOAD CAPACITY

[75] Inventors: Norbert Goetschmann; Ortwin Hahn, both of Paderborn, Germany

[73] Assignee: Leica Industrieverwaltung GmbH, Wetzlar, Germany

[21] Appl. No.: 946,438

[22] PCT Filed: Feb. 15, 1992

[86] PCT No.: PCT/DE92/00110
§ 371 Date: Nov. 18, 1992
§ 102(e) Date: Nov. 18, 1992

[87] PCT Pub. No.: WO92/15031
PCT Pub. Date: Sep. 3, 1992

[30] Foreign Application Priority Data

Feb. 19, 1991 [DE] Germany ............... 4105083
Jun. 6, 1991 [DE] Germany ............... 4118523

[51] Int. Cl.$^6$ .............................. G02B 7/02
[52] U.S. Cl. ........................ 359/820; 359/819
[58] Field of Search ....................... 359/819, 820

[56] References Cited

U.S. PATENT DOCUMENTS

| | | | |
|---|---|---|---|
| 4,147,413 | 4/1979 | Sims et al. | 359/820 |
| 4,723,833 | 2/1988 | Yamada | 359/820 |
| 4,861,137 | 8/1989 | Nagata | 359/820 |
| 5,177,641 | 1/1993 | Kobayashi et al. | 359/820 |
| 5,313,333 | 5/1994 | O'Brien et al. | 359/820 |

FOREIGN PATENT DOCUMENTS

| | | | |
|---|---|---|---|
| 1928240 | 10/1964 | Germany. | |
| 3437228 | 4/1986 | Germany. | |
| 58-125004 | 7/1983 | Japan | 359/820 |
| 59-31915 | 2/1984 | Japan | 359/820 |
| 59-201005 | 11/1984 | Japan. | |

Primary Examiner—Scott J. Sugarman
Assistant Examiner—Thomas Robbins
Attorney, Agent, or Firm—Foley & Lardner

[57] ABSTRACT

The described joint (1, 3, 2) consists of at least three joint parts preferably with different material composition and thus different thermal expansion coefficients $\alpha$. For optimum compensation of the deformation differences acting predominantly radially, which result with a temperature change, it is proposed to provide between a first joint part—for example an optical lens (1)—and a second joint part—for example a lens mounting (2)—at least one further joint part as intermediate ring (3), the ring thickness-dimensioning thereof and the material selection thereof (thermal expansion coefficient $\alpha_R$) being carried out in such a manner that the aforementioned deformation phenomena, which are material-specific and caused by temperature change, in the joint (1, 3, 2) compensate themselves in such a manner that a stress-free or low-stress mounting, for example of microoptics (1) for use in polarization-optical instruments, can be realized.

19 Claims, 1 Drawing Sheet

AXIAL-SYMMETRIC JOINT OF HIGH THERMAL LOAD CAPACITY

BACKGROUND OF THE INVENTION

The invention relates to an axial-symmetric joint of high thermal load capacity, especially of a lens and a cylindrical lens mounting.

If a cylindrical body, which is mounted in a ring, expands less than the ring on heating because of different thermal expansion coefficients, an existing gap between ring and cylinder becomes larger with the increase in temperature.

If the gap between the ring and cylinder is filled with cured adhesive for fixing the cylinder, the adhesive is stretched with the change of gap thickness. Stretchings of this kind result in turn in stresses, which are transferred to the cylinder and to the ring. In the case of the cylinder this may be, for example, an optical lens or a shaft and in the case of the ring a lens mounting or a hub.

A mounting for optical lenses is known from German Patent 34 37 228 in which the materials of the four-part mounting are chosen with respect to their respective thermal expansion coefficients in such a manner that a stretching compensation results acting only in the axial direction of the lens. Radial extension differences are compensated in this known mounting by a permanently elastic casting compound and an elastically deformed "O" ring. Depending on the stiffness of these intermediate elements, stresses are caused by the elastic radial stretchings, which prevent an application of this mounting technology, especially for high-quality low-stress or stress-free microoptics for polarization equipment.

It is therefore the object of the present invention to provide a joint in which neither structurally induced internal stresses nor temperature stresses caused by internal or external effects are transmitted to the central cylindrical mounting part in a radial direction (lens).

SUMMARY OF THE INVENTION

This object is achieved with an axial-symmetrical joint of the type stated at the outset by the features stated in the characterizing part of the main claim. Other advantageous embodiments and applications are given in the subclaims.

DETAILED DESCRIPTION OF THE INVENTION

Figure 1:
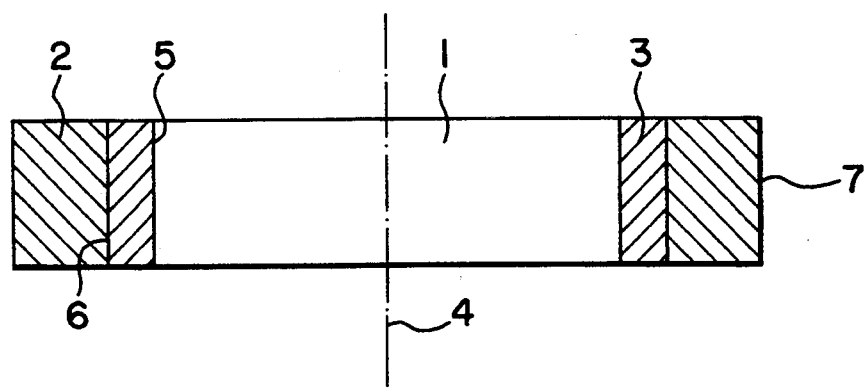
FIG. 1 illustrates an Axial-symmetric joint in accordance with the present invention.

The invention is described in the following with the aid of a schematic diagram.

The illustrated three-part joint consists of a cylindrical glass block ("first joint part"), which represents the glass lens 1. The optical axis of the lens 1 to be mounted is coincident with the axis 4 of the complete mounting system. The cylindrical mounting 2 ("second joint part") surrounds the lens 1 whilst maintaining a cylindrical distance space, which is filled by an intermediate ring 3 ("third Joint part"). Adhesive layers, which are not illustrated, may be present between the cylindrical inner wall 5 of the intermediate ring 3 and the lens 1, on the one hand, and between the cylindrical outer wall 6 of the intermediate ring 3 and the cylindrical inner wall of the mounting 2, on the other hand. The different shading chosen in the figure for the three joint parts makes clear the different material selection thereof (from outside towards axis 4): metallic material (mounting 2)—organic material (intermediate ring 3)—non-metallic/inorganic material (lens 1).

For special configurations of the joint, according to the invention, apart from the mounting 2, the intermediate ring 3 may also consists of a metallic material (metal or metal alloy) for a lens 1 consisting of optical glass. Finally it is possible, with a joint containing a shaft and a hub, to produce the "first joint part" too, that is in the case just discussed the shaft, from, for example, a metallic material.

The joint part designated as intermediate ring 3 could in principle also consist of a very thick adhesive layer, though with the adhesives currently available this would present considerable problems with the mounting technoloy: the reaction shrinkage, which is manifested in the curing of these adhesives—especially with thick adhesive layers—builds up internal stresses. The adhesive layer thickness, which would correspond to the intermediate ring thickness, would have to be at least ten times thicker than that of conventional adhesive layers. In addition a permanent fixing of the optical axis 4 would not be guaranteed with thick adhesive layers on account of creep phenomena, which occur in the adhesive layer.

The material used for the intermediate ring 3 according to one exemplary embodiment of the present invention has a larger linear thermal expansion coefficient $\alpha_R$ than that for the lens material $\alpha_L$ or the mounting material $\alpha_F$. At the lower limit of the admissible service temperature, no internal stresses should act in the lens 1. The distance space for the intermediate ring 3 enlarges with heating because of the different expansion of lens 1 and mounting 2. The intermediate ring 3—because its material has an even greater thermal expansion coefficient $\alpha_R$ than the material of the mounting 2—endeavors to increase its outer diameter to a greater extent than the inner diameter of the mounting 2. Since it is partly prevented in this by the mounting 2 and the material of the intermediate ring 3 is practically incompressible, it must expand towards axis 4.

If the dimensioning of the intermediate ring 3 is exactly matched to the rigidity of the mounting 2 and the thermal expansion coefficients of the three materials involved, the effect can be achieved that the inner diameter 5 of the intermediate ring 3 expands with heating to the same extent as the diameter of the lens 1. If the diameters of lens 1 and intermediate ring 3 expand to the same extent with heating, no stresses can occur in the lens 1. This solves the problem of a stress-free or at least low-stress mounting of optics for polarization purposes.

In the following the dimensioning according to the invention of the intermediate ring 3 with the aid of a one-dimensional consideration regarding the thermal expansion is explained schematically. It leads to a simple and very accurate principle for specifying the optimum ring thickness, in which all stress components in the central region of the lens (75% of the lens diameter) are practically zero when the Poisson's ratio $\nu$ of the material of the intermediate ring is equal to zero. The basic idea is to compensate the change of the annular gap thickness (="distance space"), which results between the lens 1 and the mounting 2 upon heating, by the change of ring thickness $\Delta R_R$ according to equation I:

$$\Delta R_R(T) = \frac{d_F(T) - d_L(T)}{2} \quad \text{(I)}$$

Here, $d_F$ and $d_L$ are the diameter of the mounting 2 and the lens 1 respectively. When the condition following from equation (I) is met, the diameters (inner and outer diameter) of the intermediate ring 3 with free thermal expansion will not correspond with the diameters of the lens 1 and the mounting 2. If the intermediate ring 3 expands in the mounting 2, compressive stresses occur in a tangential direction in the intermediate ring 3. Because of the multiaxial stress state, therefore, small radial stresses therefore also act.

Considering a linear thermal expansion, equation (I) can be rewritten as $$\alpha_R \Delta T \frac{d_{Ra} - d_{Ri}}{2} = \Delta T \frac{d_F \alpha_F - d_L \alpha_L}{2} \quad \text{(II)}$$

in which the symbols used have the following meaning:
α- thermal expansion coefficient [1/K.]
d - diameter
T - temperature change [K.]
L - lens
F - mounting
Ra - intermediate ring outside (designated with the numeral 6 in the figure)
Ri - intermediate ring inside (designated with the numeral 5 in the figure).

The lens diameter $d_L$ and the hole diameter of the mounting $d_F$ must correspond to the diameters of the intermediate ring inside $d_{Ri}$ and outside $d_{Ra}$, so that the following applies:

$$d_{Ri} = d_L \quad \text{(III)}$$

$$d_{Ra} = d_F \quad \text{(IV)}$$

Using equations (III) and (IV), equation (II) can be rewritten as:

$$\alpha_R(d_F - d_L) = d_F \alpha_F - d_L \alpha_L \quad \text{(V)}$$

If the lens diameter $d_L$ is given, the hole diameter $d_F$ of the mounting 2 can be calculated from the equation (V) rearranged for $dF_F$:

$$d_F = \frac{\alpha_R - \alpha_L}{\alpha_R - \alpha_F} d_L \quad \text{(VI)}$$

A ratio V $$V = \frac{\alpha_R - \alpha_L}{\alpha_R - \alpha_F} \quad \text{(VII)}$$

can thus be defined, with which the hole diameter $d_F$ of the mounting 2 and the ring thickness of the intermediate ring 3 can be determined for a given combination of materials.

For a first exemplary embodiment of the present invention it is assumed that the expansion coefficient $\alpha_L$ of the lens 1 is smaller than that of the mounting 2, so that the following applies:

$$\alpha_L < \alpha_F.$$

From this the condition results that the expansion coefficient $\alpha_R$ of the intermediate ring 3 must be larger than that of the mounting 2 and that of the lens 1:

$$\alpha_R > \alpha_F > \alpha_L.$$

Otherwise a ratio V<1 would result from equation (VII). A value of V of less than 1, however, is not possible, since V indicates the ratio of the outer to the inner diameter of the intermediate ring 3 and the outer diameter cannot be smaller than the inner diameter. The material of the intermediate ring 3 should manifest as the preferred characteristic greatest possible flexible-elastic behavior, so that the different thermal expansion of lens 1 and intermediate ring 3, which occurs in the axial direction, does not cause inadmissibly high shear stresses. A possible flexible-elastic material in this respect is for example a plastics intermediate ring of a polycarbonate with the tradename "Makrolon 8020", the modulus of elasticity of which, at 3,900 MPa, is approximately 20 times smaller than that of glass. For the aforementioned reasons combinations of materials in which the glass lens 1 is mounted in a metal mounting 2 and an intermediate ring 3 of a polymeric material (filled or unfilled) are especially suitable, since polymeric materials have a significantly greater expansion coefficient than metal materials and are flexible-elastic.

Finite-element calculations were used to derive the empirical formula that, for intermediate ring materials which have a Poisson's ratio $v$ different from zero, the ratio V calculated according to equation VII must be converted into V' as follows:

$$V' = V - Vv + v \quad \text{(VIII)}$$

The material properties of the first embodiment are listed in the following Table 1:

TABLE 1

| Example No. 1 | Material | Expansion coefficient | Modulus of elasticity |
| --- | --- | --- | --- |
| Lens (1) | BK7 | 7.1 × 10⁻⁶ 1/K | 81.00 GPa |
| Intermediate ring (3) | Makrolon 8020 | 45.0 × 10⁻⁶ 1/K | 0.39 GPa |
| Mounting (2) | brass | 21.4 × 10⁻⁶ 1/K | 96.00 GPa |

Furthermore, the intermediate ring 3 can also consist of a filled or unfilled polymeric casting compound or adhesive.

For a third embodiment of the present invention it holds that the expansion coefficient $\alpha_L$ of the lens 1 is greater than that of the mounting 2:

$$\alpha_L > \alpha_F.$$

This rule is met, for example, for the materials combination: optical glass "FK51" and steel. The condition then applies that the expansion coefficient $\alpha_R$ of the intermediate ring 3 must be smaller than that of the mounting 2 and the lens 1:

$$\alpha_R < \alpha_F < \alpha_L.$$

The material properties of an exemplary embodiment of this kind are listed in Table 3:

TABLE 3

| Example No. 3 | Material | Expansion coefficient | Modulus of elasticity |
|---|---|---|---|
| Lens (1) | FK51 | $13.6 \times 10^{-6}$ 1/K | 79 GPa |
| Intermediate ring (3) | 10 Ni 14 steel | $9.6 \times 10^{-6}$ 1/K | 206 GPa |
| Mounting (2) | unalloyed steel | $12.0 \times 10^{-6}$ 1/K | 210 GPa |

The intermediate ring(s) (3) according to the invention is(are) preferably connected at both contact sides via a thin adhesive layer to the lens 1 and the mounting 2. Here the adhesive layer on the mounting side (cf. the region that is characterized with the reference numeral 6) has the function that upon heating compressive stresses (applies for the case: $\alpha_L < \sigma_F$) or tensile stresses (applies for the case: $\alpha_L > \sigma_F$) are transmitted between the mounting 2 and the intermediate ring 3 without a "creep" occurring in the adhesive layer in this process, so that only an elastic deformation thus occurs. These conditions are met in general by adhesives whose glass transition temperatures are higher than the highest temperature at which the assembly (=joint) is used. By glass transition temperature in adhesion technology is meant the temperature from which the shear modulus determined in the torsion pendulum test according to DIN 53445 as a function of the temperature drops by at least an order of magnitude and at which the loss factor is maximum. For the application case of microscopy this condition is met sufficiently well by, for example, the adhesive "Araldit AY106".

No creep should occur in the lens-side adhesive layer 5, either. However an adhesive may also be used in this area the glass transition temperature of which is within or below the range of the component service temperature, since with correct dimensioning of the intermediate ring 3 no significant normal stresses are transmitted through the cylindrical joint surfaces 5, 6. The tangential stresses resulting in an axial direction are uncritical on account of the low cylinder length. The flexible-elastic behavior can reduce stresses which otherwise occur as a result of inhomogeneous temperature distribution with rapid heating or cooling.

In application cases in which stresses as a result of inhomogeneous component temperature can be temporarily accepted in favor of immunity to irreversible deformations of the adhesive layer, it has proven expedient to use the same adhesive as is used for the mounting-side adhesive layer 6 for the lens-side adhesive layer 5. In addition this brings cost advantages for the production.

An exemplary embodiment dimensioned according to the invention is given below and the temperature stresses discussed that result with a heating of this joint of 120 K. This concerns a lens mounting 2 of aluminum ($\alpha_F = 12 \times 10^{-6}$ 1/K.) with an outer diameter of 60.4 mm and a hole diameter of 55.2 mm. The intermediate ring 3 consists of plastic ($\alpha_R = 45 \times 10^{-6}$ 1/K.) and has an inner diameter of 50 mm. Lens 1 consists of optical glass ($\alpha_L = 7.1 \times 10^{-6}$ 1/K.). The ratio V' (cf. equations VII and VIII) is calculated as V'=1.104. With a lens diameter of 50 mm, an intermediate ring thickness according to the invention of $\Delta R_R = 2.6$ mm results from this. In addition the temperature stresses were calculated that act in a conventional joint with 0.5 mm adhesive layer thickness. A comparison of all stresses that act in the two joints with a heating of $\Delta T = 120$ K. shows that, although stresses also occur in the joint according to the invention at the lens edge on account of the multiaxial stress state, the stresses acting radially and tangentially, however, in the central partial region (75% of the lens diameter) of the lens which are 5.8 MPa with the conventional bond, are reduced to practically zero ($\sigma < 0.1$ MPa) with the joint according to the invention. With a postcorrection of the intermediate ring thickness by means of finite-element calculation an absolutely temperature-stress-free state can be produced in this region.

The following advantages thus result overall for the present invention:

Thermal stresses are avoided or drastically reduced. If the proposed dimensioning rule is obeyed, no normal stresses occur perpendicular with respect to the joint surfaces in the adhesive layer 5 between lens 1 and intermediate ring 3.

Since the adhesive layers do not undergo significant loading in the normal direction of the joint surfaces, no damages can occur in the adhesive layer on account of temperature changes. The partial damages in adhesive layers of conventional lens mountings lead to deformation states that are not rotationally symmetrical. The function of an optical lens is disrupted by this nonsymmetry, so that a use in polarization-optical systems in particular is excluded.

It is of further advantage that new degrees of freedom in the choice of the adhesives result from the present invention. With the conventional joint the adhesive layer must compensate the different thermal expansion of lens and mounting by elastic stretching. Adhesives are used for this for which the range of glass transition temperature lies below the lowest permissible service temperature. Above the glass transition temperature the shear modulus, and thus also the modulus of elasticity, is much less than below the glass transition temperature. Corresponding to the low rigidity, lower stresses occur with the elastic stretchings. Hitherto this had to be considered as a main feature in the choice of adhesive and disadvantages of a different kind had to be taken into consideration. With the type of joint according to the invention, on the other hand, the processing characteristics of an adhesive can be taken into greater consideration than hitherto in a choice of adhesive.

With the present invention an extended range of service temperature is also realized. Since with the new solution a higher glass transition temperature is permissible, high temperature-resistant adhesives can be used. The range of permissible service temperature can be considerably extended by the use of these adhesives and the lower mechanical loading of the adhesive layer. In a conbination of materials in which the mounting 2 consists of steel and the intermediate ring 3 of aluminum, the range of service temperature can indeed be so greatly extended that new fields of application for high-precision joints can be gained.

Finally, the solutions proposed according to the invention also contribute to a reduction of the manufacturing costs relating to production technology. Although the intermediate ring 3 and the second adhesive surface initially represent a certain extra expense, the centering of the lens 1, which involves high labor costs, is eliminated however, because only a minimum adhesive layer thickness, which can be for example 0.05 mm, is necessary. If the lower service temperature is to lie under the joint temperature, the fit between mounting 2 and intermediate ring 3 must even be overdimensioned. The use of fast-curing adhesives, on the one hand, and lower proportions of rejects, on the other hand, also contribute to reducing the production costs.

Furthermore, it can be emphasized as an advantage that the axial and the radial fixing of the lens is ensured by the intermediate elements at the cylindrical lens outer surface, whereas, for example, in the above-described state of the art the axial fixing must be additionally effected by intermediate elements disposed on the front surfaces of the lens.

The principle on which the present invention is based, namely to select the ratio of outer to inner diameter of the intermediate ring 3 by a first approximation in such a manner that the wall thickness of the intermediate ring 3 expands on heating to the same degree as the annular gap between the outer diameter of the lens and the hole diameter of the mounting 2 enlarges with free thermal expansion, opens up new possibilities for multi-part precision joints.

Adaptations and slight modifications in the dimensioning rules lie within the scope of the present invention. Thus, depending on the rigidity of mounting 2 and intermediate ring 3, a slight correction of the diameter ratio of the intermediate ring 3, which was determined by a first approximation, can be carried out so that even very small radial differences in stretching between the outer diameter of the lens and the hole of the composite mounting, which would result with free stretching, can be eliminated.

List of Reference Numbers, Signs and Formula Symbols

1 - first joint part (lens (L))
2 - second joint part (mounting (F))
3 - third joint part (intermediate ring (R))
4 - axis of the mounting system (optical axis)
5 - cylindrical inner wall of (3)
6 - cylindrical outer wall of (3)
7 - outer wall of (2)
L - lens (1)
F - mounting (2)
R - intermediate ring (3)
$\alpha_R$ - linear thermal expansion coefficient of the material for the intermediate ring (R) [1/K.]
$\alpha_L$ - linear thermal expansion coefficient of the material for the lens (L) [1/K.]
$\alpha_F$ - linear thermal expansion coefficient of the material for the mounting (F) [1/K.]
$\Delta R_R$ - ring thickness change
$d_F$ - hole diameter of the mounting (2)
$d_L$ - diameter of the lens (1)
$d_{Ra}$ outer diameter of the intermediate ring (3) (indicated by (6) in the figure)
$d_{ri}$ - inner diameter of the intermediate ring (3) (indicated by (5) in the figure)
T - temperature [K]
$\Delta T$ - temperature change [K]
V - ratio
V'- (converted) ratio
$\nu$- Poisson's ratio of the material of the intermediate ring
$\sigma$- mechanical stress [MPa]

We claim:

1. An axial-symmetric joint having high thermal load capacity for stress-free or low-stress mounting of a cylindrical joint part comprising:

a) a mounting consisting of a first material for mounting a second material, said mounting being comprised of a material selected from the group consisting of metal or metal alloy, brass, steel and unalloyed steel;

b) a second material mounted within said mounting, said second material being comprised of an optical glass material selected from BK7 or FK51; and c) at least one intermediate ring disposed between said second material and said mounting, said intermediate ring having an inner and an outer diameter wherein the inner diameter corresponds to the diameter of said second material, and wherein said intermediate ring is composed of a material of a thickness so that the inner diameter of said intermediate ring expands to substantially the same extent as the diameter of said second material with a change in temperature, said material being selected from the group consisting of polycarbonate plastic, polymeric material, metal and "10 Ni 14" steel, and wherein the mounting, the second material and the intermediate ring have thermal expansion coefficients satisfying the relation:

$$\alpha_R > \alpha_F > \alpha_L$$

wherein $\alpha_R$ is the thermal expansion coefficient of the intermediate ring, $\alpha_F$ is the thermal expansion coefficient for the mounting, and $\alpha_L$ is the thermal expansion coefficient for said second material.

2. An axial-symmetric joint as claimed in claim 1, wherein said intermediate ring is connected to said second material and said mounting by thin adhesive layers.

3. An axial-symmetric joint as claimed in claim 1, wherein said mounting is made of a metal or metal alloy, said second material is a lens made of optical glass and said intermediate ring is made of a polymeric material.

4. An axial-symmetric joint as claimed in claim 1, wherein the mounting is selected from brass or steel, said second part is optical glass "BK7", and said intermediate ring is polycarbonate plastic.

5. An axial-symmetric joint as claimed in claim 1, wherein the intermediate ring comprises a filled or unfilled polymeric casting compound or an adhesive.

6. An axial-symmetric joint as claimed in claim 1, wherein said mounting is unalloyed steel, said second material is optical glass "FK51" and said intermediate ring is metal alloy "10 Ni 14" steel.

7. An axial-symmetric joint as claimed in claim 1 wherein the mounting is selected brom brass or steel, said second part is optical geass "BK7", and said intermediate ring is metal.

8. An axial-symmetric joint having high thermal load capacity for stress-free or low-stress mounting of a cylindrical joint part comprising:

a) a mounting consisting of a first material for mounting a second material;

b) a second material mounted within said mounting; and c) at least one intermediate ring disposed between said second material and said mounting, said intermediate ring having an inner and an outer diameter wherein the inner diameter corresponds to the diameter of said second material, and wherein said intermediate ring is composed of a material of a thickness so that the inner diameter of said intermediate ring expands to substantially the same extent as the diameter of said second material with a change in temperature, wherein an adhesive layer is provided between the intermediate ring and the mounting, said adhesive layer having a glass transition temperature higher than the highest temperature to which said mounting and said intermediate ring to be joined are subjected.

9. An axial-symmetric joint having high thermal load capacity for stress-free or low-stress mounting of a cylindrical joint part comprising:
   a) a mounting consisting of a first material for mounting a second material;
   b) a second material mounted within said mounting; and
   c) at least one intermediate ring disposed between said second material and said mounting, said intermediate ring having an inner and an outer diameter wherein the inner diameter corresponds to the diameter of said second material, and wherein said intermediate ring is composed of a material of a thickness so that the inner diameter of said intermediate ring expands to substantially the same extent as the diameter of said second material with a change in temperature, wherein an adhesive layer is provided between the intermediate ring and the second material, said adhesive layer having a glass transition temperature less than or equal to the range of service temperatures for said second material and said intermediate ring to be joined.

10. An axial-symmetric joint having high thermal load capacity for stress-free or low-stress mounting of a cylindrical joint part comprising:
    a) a mounting consisting of a first material for mounting a second material;
    b) a second material mounted within said mounting; and
    c) at least one intermediate ring disposed between said second material and said mounting, said intermediate ring having an inner and an outer diameter wherein the inner diameter corresponds to the diameter of said second material, and wherein said intermediate ring is composed of a material of a thickness so that the inner diameter of said intermediate ring expands to substantially the same extent as the diameter of said second material with a change in temperature, wherein said mounting is made of steel having a thermal expansion coefficient of $12 \times 10^{-6}$ 1/K., an inner diameter of about 55.2 mm and a wall thickness of about 2.6 mm, said second material is made of optical glass having a thermal expansion coefficient of $7.1 \times 10^{-6}$ 1/K., and said intermediate ring is made of plastic having a thermal expansion coefficient of $45 \times 10^{-6}$ 1/K., a Poisson's ratio of 0.3, an inner diameter of about 50 mm and a ring thickness of about 2.6 mm.

11. An axial-symmetric joint having high thermal load capacity for stress-free or low-stress mounting of a cylindrical joint part comprising:
    a) a mounting consisting of a first material for mounting a second material, said mounting being comprised of a material selected from the group consisting of metal or metal alloy, brass, steel and unalloyed steel;
    b) a second material mounted within said mounting, said second material being comprised of an optical glass material selected from BK7 or FK51;
    c) at least one intermediate ring disposed between said second material and said mounting, said intermediate ring having an inner and an outer diameter wherein the inner diameter corresponds to the diameter of sad second material, said material being selected from the group consisting of polycarbonate plastic, polymeric material, metal and "10 Ni 14" steel, and wherein the mounting, the second material and the intermediate ring have thermal expansion coefficients satisfying the relation:

$$\alpha_R > \alpha_F > \alpha_L$$

wherein $\alpha_R$ is the thermal expansion coefficient of the intermediate ring, $\alpha_F$ is the thermal expansion coefficient for the mounting, and $\alpha_L$ is the thermal expansion coefficient for said second material; and
    d) thin adhesive layers disposed between said mounting and said intermediate ring, and disposed between said intermediate ring and said second material, and wherein said intermediate ring is composed of a material of a thickness to optimally compensate for radial deformation differences occurring between the mounting, the second material and the intermediate ring with a change in temperature.

12. An axial-symmetric joint as claimed in claim 11, wherein said mounting is made of a metal or metal alloy, said second material is a lens made of optical glass and said intermediate ring is made of a polymeric material.

13. An axial-symmetric joint as claimed in claim 11, wherein the mounting is selected from brass or steel, said second part is optical glass "BK7", and said intermediate ring is polycarbonate plastic.

14. An axial-symmetric joint as claimed in claim 11, wherein the intermediate ring comprises a filled or unfilled polymeric casting compound or an adhesive.

15. An axial-symmetric joint as claimed in claim 11, wherein said mounting is unalloyed steel, said second material is optical glass "FK51" and said intermediate ring is metal alloy "10 Ni 14" steel.

16. An axial-symmetric join as claimed in claim 11 wherein the mounting is selected brom brass or steel, said second part is optical geass "BK7", and said intermediate ring is metal.

17. An axial-symmetric joint having high thermal load capacity for stress-free or low-stress mounting of a cylindrical joint part comprising:
    a) a mounting consisting of a first material for mounting a second material;
    b a second material mounted within said mounting;
    c) at least one intermediate ring disposed between said second material and said mounting, said intermediate ring having an inner and an outer diameter wherein the inner diameter corresponds to the diameter of said second material; and
    d) thin adhesive layers disposed between said mounting and said intermediate ring, and disposed between said intermediate ring and said second material, and wherein said intermediate ring is composed of a material of a thickness to optimally compensate for radial deformation differences occurring between the mounting, the second material and the intermediate ring with a change in temperature, wherein said adhesive layers has a glass transition temperature higher than the highest temperature to which said mounting and said intermediate ring to be joined are subjected.

18. An axial-symmetric joint having high thermal load capacity for stress-free or low-stress mounting of a cylindrical joint part comprising:
    a) a mounting consisting of a first material for mounting a second material;

b) a second material mounted within said mounting;
c) at least one intermediate ring disposed between said second material and said mounting, said intermediate ring having an inner and an outer diameter wherein the inner diameter corresponds to the diameter of said second material; and
d) thin adhesive layers disposed between said mounting and said intermediate ring, and disposed between said intermediate ring and said second material, and wherein said intermediate ring is composed of a material of a thickness to optimally compensate for radial deformation differences occurring between the mounting, the second material and the intermediate ring with a change in temperature, wherein said adhesive layers has a glass transition temperature less than or equal to the range of service temperatures for said second part and said intermediate ring to be joined.

19. An axial-symmetric joint having high thermal load capacity for stress-free or low-stress mounting of a cylindrical joint part comprising:
a) a mounting consisting of a first material for mounting a second material;
b) a second material mounted within said mounting;
c) at least one intermediate ring disposed between said second material and said mounting, said intermediate ring having an inner and an outer diameter wherein the inner diameter corresponds to the diameter of said second material; and
d) thin adhesive layers disposed between said mounting and said intermediate ring, and disposed between said intermediate ring and said second material, and wherein said intermediate ring is composed of a material of a thickness to optimally compensate for radial deformation differences occurring between the mounting, the second material and the intermediate ring with a change in temperature, wherein said mounting is made of steel having a thermal expansion coefficient of $12 \times 10^{-6}$ 1/K., an inner diameter of about 55.2 mm and a wall thickness of about 2.6 mm, said second material is made of optical glass having a thermal expansion coefficient of $7.1 \times 10^{-6}$ 1/K., and said intermediate ring is made of plastic having a thermal expansion coefficient of $45 \times 10^{-6}$ 1/K., a Poisson's ratio of 0.3, an inner diameter of about 50 mm and a ring thickness of about 2.6 mm.

* * * * *